UNITED STATES PATENT OFFICE.

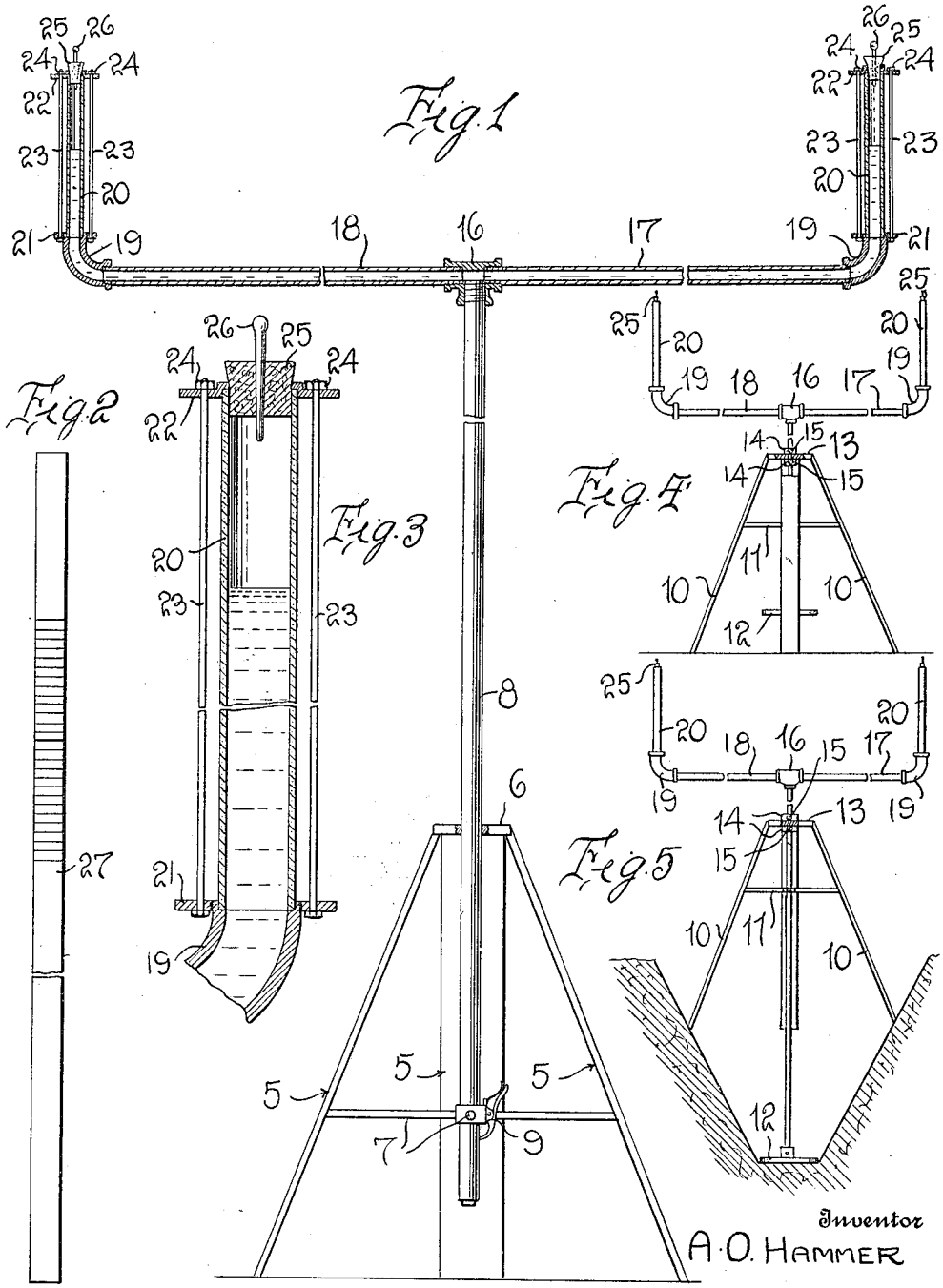

ANDERS O. HAMMER, OF WILLIAMS, MONTANA.

LEVEL.

1,224,536.  Specification of Letters Patent.  Patented May 1, 1917.

Application filed April 22, 1916.  Serial No. 92,952.

*To all whom it may concern:*

Be it known that I, ANDERS O. HAMMER, a citizen of the United States, residing at Williams, in the county of Teton and State of Montana, have invented certain new and useful Improvements in Levels, of which the following is a specification, reference being had to the accompanying drawings.

This invention is a level which may be used for surveying and indicating the rise and fall or heights of terrain.

One object is to provide an instrument having a high degree of accuracy in leveling operations.

Another object is to provide an instrument having few parts, simple in construction and one that may be readily set up for use.

A further object is to provide an instrument that is more particularly adapted to measure the level in drainage ditches.

A still further object is to provide a level in which fluid is used and by its construction giving stability to the fluid viewing columns, thus rendering it sensitive to various inclinations.

The invention broadly comprises a tripod or stand, a staff mounted thereon, a horizontal member connected to the staff, tubular members disposed at right angles and on the ends of the horizontal member, the said staff and horizontal and tubular members being adapted to receive fluid, and means to vent and retain the fluid in the tubular members.

A practical form of the invention is shown in the accompanying drawings, in which—

Figure 1 is a sectional view of the instrument and tripod;

Fig. 2 is a front elevation of the rod;

Fig. 3 is an enlarged sectional view of one of the columns;

Fig. 4 is a side elevation of one type of stand; and

Fig. 5 shows how the instrument may be used in a ditch.

The tripod or stand may be of any usual or preferred type of construction. The one form which is illustrated in Fig. 1, has inclined legs 5 which connect with the top 6, and to hold the legs in their spaced relation, braces 7 are provided. The top 6 is provided with a suitable aperture through which the staff 8 passes. This staff 8 may have a suitable latch positioned on one of the cross braces 7 to maintain it in a predetermined position. This latch may be formed where the two cross braces 7 cross each other, as indicated at 9. Another form of stand is illustrated in Fig. 4, which is provided with the inclined legs 10 and suitable cross braces 11. The bottom or ground end of the staff is provided with a suitable plate 12 which may be connected to the staff by suitable means. The staff on this tripod or stand, shown in Fig. 4, passes through a top 13 which connects the inclined legs 10 together. This top 13 has a suitable aperture or hole through which the staff 8 passes. Adjacent the respective upper and lower faces of the top 13 and mounted on the staff 8, there are shown two collars 14 which may be provided with suitable thumb screws or nuts 15. These collars and their thumb nuts provide a holding means to maintain the staff 8 in a vertical position.

The staff 8 may be of tubular form and carries at its upper end suitable connecting means shown by the T 16, indicated in Figs. 1 and 4. Extending in a horizontal direction from this T are the tubular members 17 and 18. These tubular members connect with the T. The upper end of the tubular staff 8 is closed by any suitable plug. At the outer ends of these tubular members, there may be mounted suitable elbows 19, as shown in Figs. 1 and 4. Carried in the open ends of the elbows 19 are suitable fluid columns 20. These fluid columns are preferably of glass in order that the level of the fluid therein may be readily seen. These columns 20 may be secured in the openings of the elbows 19 in any suitable way or preferred manner. One method of connecting or sealing the joints between the metal of the elbow and the glass, is by a mixture of litharge and glycerin which hardens and forms a water-tight seal or, if preferred, plaster of Paris may be used. These water columns being preferably made of glass, it is thought that some protection should be given to prevent breakage and one way of giving this protection is shown more particularly in Fig. 3, which comprises the two perforated end plates 21 and 22 and the bolts 23 extending therebetween and holding the plates in a suitable manner such as is shown by the conventional nuts 24. Disposed in the upper end of the glass 20 is a suitable closing means 25 which is shown as a cork. Passing through this cork is a suitable pin or plug 26 which passes entirely through the cork and when withdrawn permits air to pass from the atmosphere to the upper surface of the fluid and thereby prevents any tendency of a vacuum to form in the upper portions of the two glasses.

Referring to Fig. 5, it will show how the tripod stand and ground plate may be utilized in a ditch. Fig. 2 illustrates a preferred form of rod which has its graduation suitably marked thereon to conform to a particular type of level and to the predetermined height of fluid as is viewed in the two columns. The leveling fluid may be filled into the level through one of the openings closed by the plug 25.

In the practical operation of leveling, the instrument is set up, and the instrument then may be leveled by means of the two heights of fluid in the glasses. The rod shown in Fig. 2 and which may be indicated by the numeral 27 has a particular mark made thereon to correspond to what may be the fluid surface level. The use of a rod is usual and customary in both leveling and surveying operations. After the instrument has been set up and leveled, the rodman will take the rod a predetermined distance away from the level and by sighting across the liquid so that the two surfaces will coincide with a particular mark upon the rod, this will give either the increase of height or the decrease, thus showing the variations in the contour of the terrain. As the device is very simple in construction and requires so few parts and those parts are readily obtainable in practically all localities, the device is susceptible of use in and for all leveling operations even by those who have had little training in surveying. It gives an instrument which, in the hands of a farmer or rancher, provides a ready means of determining the various altitudes of his land so that he may run canals or irrigating ditches in an intelligent manner.

Minor changes in form and the details of construction may be resorted to without departing from the spirit of my invention or the scope of the appended claims.

Having described my invention, what I claim is:—

1. A leveling instrument comprising a tripod, a staff vertically adjustable through said tripod and having a leveling tube thereon formed with upwardly extending legs, a base plate detachably mounted upon the lower end of the staff, the staff being shiftable downward through the tripod so as to carry its base below the lower ends of the legs, and leveling fluid within said leveling tube.

2. A leveling instrument comprising a staff, a support upon which the staff is mounted, a leveling tube mounted upon the staff and extending at right angles thereto, elbows at the ends of the tube, the outer ends of the elbows having flanges, sight glasses mounted upon said elbows, an annular member mounted upon the upper end of each sight glass, longitudinally extending bolts passing through the annular member and through the flange of the corresponding elbow and holding the sight glass in position upon the elbow and acting as a protection to the sight glass, removable closures for the ends of the tubes, and leveling fluid within the leveling tube.

In testimony whereof I hereunto affix my signature in the presence of two witnesses.

ANDERS O. HAMMER.

Witnesses:
B. J. UFKES,
M. C. WICKWARE.

Copies of this patent may be obtained for five cents each, by addressing the "Commissioner of Patents, Washington, D. C."